United States Patent
Chun et al.

(10) Patent No.: US 8,761,096 B2
(45) Date of Patent: Jun. 24, 2014

(54) PERFORMING RANDOM ACCESS PROCEDURES USING EXTENDED RANDOM ACCESS RESPONSE

(75) Inventors: Sung-Duck Chun, Gyeonggi-Do (KR); Seung-June Yi, Gyeonggi-Do (KR); Sung-Jun Park, Gyeonggi-Do (KR); Young-Dae Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 281 days.

(21) Appl. No.: 12/999,545

(22) PCT Filed: Aug. 5, 2009

(86) PCT No.: PCT/KR2009/004377
§ 371 (c)(1),
(2), (4) Date: Dec. 16, 2010

(87) PCT Pub. No.: WO2010/016726
PCT Pub. Date: Feb. 11, 2010

(65) Prior Publication Data
US 2011/0170503 A1   Jul. 14, 2011

Related U.S. Application Data

(60) Provisional application No. 61/087,153, filed on Aug. 7, 2008, provisional application No. 61/102,860, filed on Oct. 5, 2008.

(51) Int. Cl.
*H04W 74/08* (2009.01)
(52) U.S. Cl.
USPC ........................................................ 370/329
(58) Field of Classification Search
USPC ......... 370/328, 329, 331, 335, 344, 350, 480; 455/422, 436, 522
See application file for complete search history.

(56) References Cited

U.S. PATENT DOCUMENTS

| 8,559,382 | B2 * | 10/2013 | Kim et al. | 370/329 |
| 8,630,653 | B2 * | 1/2014 | Ahn et al. | 455/450 |
| 2006/0221892 | A1 * | 10/2006 | Usuda et al. | 370/328 |
| 2008/0130588 | A1 * | 6/2008 | Jeong et al. | 370/335 |

(Continued)

FOREIGN PATENT DOCUMENTS

KR   10-2007-0106914 A   11/2007
KR   10-2008-0032258 A   4/2008

(Continued)

OTHER PUBLICATIONS

LG Electronics Inc.,"MAC Random Access Response Extension", Agenda item: 6.1.1.4, 3GPP TSG-RAN WG2 #63, Aug. 11, 2008, XP050319312, R2-084177.

(Continued)

*Primary Examiner* — Chirag Shah
*Assistant Examiner* — Jael Ulysse
(74) *Attorney, Agent, or Firm* — McKenna Long & Aldridge LLP

(57) ABSTRACT

A random access procedure is performed by receiving information related to a random access preamble, the information indicating a first random access preamble related to a first format and a second random access preamble related to a second format; selecting a random access preamble according to the received information; transmitting the selected random access preamble; receiving a random access response; and decoding the received random access response according to the format associated with the selected random access preamble.

12 Claims, 9 Drawing Sheets

(56) References Cited

U.S. PATENT DOCUMENTS

| | | | |
|---|---|---|---|
| 2008/0232329 A1* | 9/2008 | Jen | 370/335 |
| 2008/0310395 A1* | 12/2008 | Kashima | 370/350 |
| 2009/0041240 A1* | 2/2009 | Parkvall et al. | 380/247 |
| 2009/0052388 A1* | 2/2009 | Kim et al. | 370/329 |
| 2009/0109912 A1* | 4/2009 | DiGirolamo et al. | 370/329 |
| 2009/0156194 A1* | 6/2009 | Meylan | 455/422.1 |
| 2009/0163211 A1* | 6/2009 | Kitazoe et al. | 455/436 |
| 2009/0225711 A1* | 9/2009 | Sammour et al. | 370/329 |
| 2009/0268666 A1* | 10/2009 | Vujcic | 370/328 |
| 2010/0041428 A1* | 2/2010 | Chen et al. | 455/522 |
| 2010/0085956 A1* | 4/2010 | Ahn et al. | 370/344 |
| 2010/0178920 A1* | 7/2010 | Kitazoe et al. | 455/436 |
| 2010/0189071 A1* | 7/2010 | Kitazoe | 370/331 |
| 2010/0309877 A1* | 12/2010 | Damnjanovic et al. | 370/331 |
| 2010/0331003 A1* | 12/2010 | Park et al. | 455/450 |
| 2011/0096748 A1* | 4/2011 | Meyer et al. | 370/329 |
| 2012/0257595 A1* | 10/2012 | Ohta et al. | 370/329 |
| 2012/0275435 A1* | 11/2012 | Meyer et al. | 370/331 |

FOREIGN PATENT DOCUMENTS

| | | |
|---|---|---|
| KR | 10-2008-0037577 A | 4/2008 |
| WO | WO 2008-023932 A1 | 2/2008 |
| WO | WO 2008/054114 A2 | 5/2008 |

OTHER PUBLICATIONS

RAN1, "LS on Random Access Physical Layer Parameters", Internet Citation, Nov. 6, 2006, XP002484601, Retrieved from the Internet: URL:htpp://www.3gpp.org/ftp/teg_ran/WG1_RL1/TSGR1_47/Docs/R1-063612.zip [retrieved on Jun. 17, 2008], XP-002484601, R1-063612.

"$3^{rd}$ Generation Partnership Project; Technical Specification Group Radio Access Network; Evolved Universal Terrestrial Radio Access (E-UTRA) Medium Access Control (MAC) protocol specification (Release 8)", 3GPP TS 36.321 v8.1.0 (Mar. 1, 2008), XP050377617, R2-084177.

Qualcomm Europe, "RACH preamble group selection", Agenda item: 6.1.1.6, 3GPP TSG-RAN WG2 #62bis, Jun. 24, 2008, XP050140678, R2-083257.

ETRI, "Group selection for RA preamble", Agenda Item: 6.1.1.6, 3GPP TSG RAN WG2 #62bis, Jun. 23, 2008, XP050140715, R2-083302.

LG Electronics Inc., "Proposed CR to 36.321 REL-8 Correction to RACH procedure", 3GPP DRAFT; R2-083279 [REL-8], 3GPP TSG-RAN2 Meeting #62bis, Warsaw, Poland, Jun. 30-Jul. 4, 2008, [retrieved on Jun. 24, 2008]—R2-083279.

3GPP TSG RAN WG2 #62bis R2-083302, ETRI, "Group Selection for RA Preamble," Jun. 30-Jul. 8, 2008, Warsaw, Poland.

* cited by examiner (b) Rel-8 UE's decoding          (b) Rel-9 eNB's encoding (b) Rel-9 eNB's encoding

PERFORMING RANDOM ACCESS PROCEDURES USING EXTENDED RANDOM ACCESS RESPONSE

This application claims the benefit of priority of U.S. Provisional Application No. 61/087,153 filed on Aug. 7, 2008, U.S. Provisional Application No. 61/102,860 filed on Oct. 5, 2008, Korean Patent Application No. 10-2009-0070270 filed on Jul. 30, 2009 and PCT Application No. PCT/KR2009/004377 filed Aug. 5, 2009, all of which are incorporated by reference in their entirety herein.

TECHNICAL FIELD

The present invention relates to an apparatus and method for random access procedures.

BACKGROUND ART

In the related art, the procedure of sending a random access response via a common control channel was problematic. As such, the related art technologies do not sufficiently address such issues, and thus do not offer appropriate solutions.

DISCLOSURE OF INVENTION

Technical Solution

The present inventors recognized at least the above-identified drawbacks of the related art. Based upon such recognition, the various features described hereafter have been conceived such that when the base station performs the procedure of sending a random access response via a common control channel, such random access response is sent or informed in one or more different formats depending upon the types of mobile terminals. As such, mobile terminals of different release (or system version) types (e.g., Rel-8, Rel-9, etc.) or mobile terminals that support different standards (e.g., LTE, LTE Advanced, etc.) can perform random access procedures more effectively.

MODE FOR THE INVENTION

The inventive concepts and features herein are explained in terms of a Long Term Evolution (LTE) system or other so-called 4G communication systems, which is an enhancement to current 3GPP technologies. However, such details are not meant to limit the various features described herein, which are applicable to other types of mobile and/or wireless communication systems and methods.

Hereafter, the term "mobile terminal" will be used to refer to various types of user devices, such as mobile communication terminals, user equipment (UE), mobile equipment (ME), and other devices that support various types of wireless communication technologies.

Embodiments of the present invention are related to exchanging data between a base station (i.e. Node B, eNB, access point, etc.) and one or more mobile terminals. In particular, when the base station performs the procedure of sending a random access response via a common control channel, such random access response is sent or informed in one or more different formats depending upon the types of mobile terminals.

As a result, some unexpected results may be that mobile terminals of different release (or system version) types (e.g., Rel-8, Rel-9, etc.) or mobile terminals that support different standards (e.g., LTE, LTE Advanced, etc.) can perform random access procedures more effectively.

Second generation (2G) mobile communications relate to transmitting and receiving voice signals in a digital manner, and include technologies such as CDMA, GSM, and the like. As an enhancement from GSM, GPRS was developed to provide packet switched data services based upon GSM.

Third generation (3G) mobile communications relate to transmitting and receiving not only voice signals, but also video and data. The 3GPP (Third Generation Partnership Project) developed the IMT-2000 mobile communication system and selected WCDMA as its radio access technology (RAT). The combination of IMT-2000 and WCDMA can be referred to as UMTS (Universal Mobile Telecommunications System), which comprises a UMTS Terrestrial Radio Access Network (UTRAN).

As data traffic is expected to increase dramatically, the standardization for 3rd generation mobile communications is underway to establish a Long-Term Evolution (LTE) network that supports greater bandwidth. LTE technologies are employed for an Evolved-UMTS (E-UMTS), which has an Evolved-UTRAN (E-UTRAN) that uses OFDMA (Orthogonal Frequency Division Multiple Access) as its radio access technology (RAT).

Figure 1:
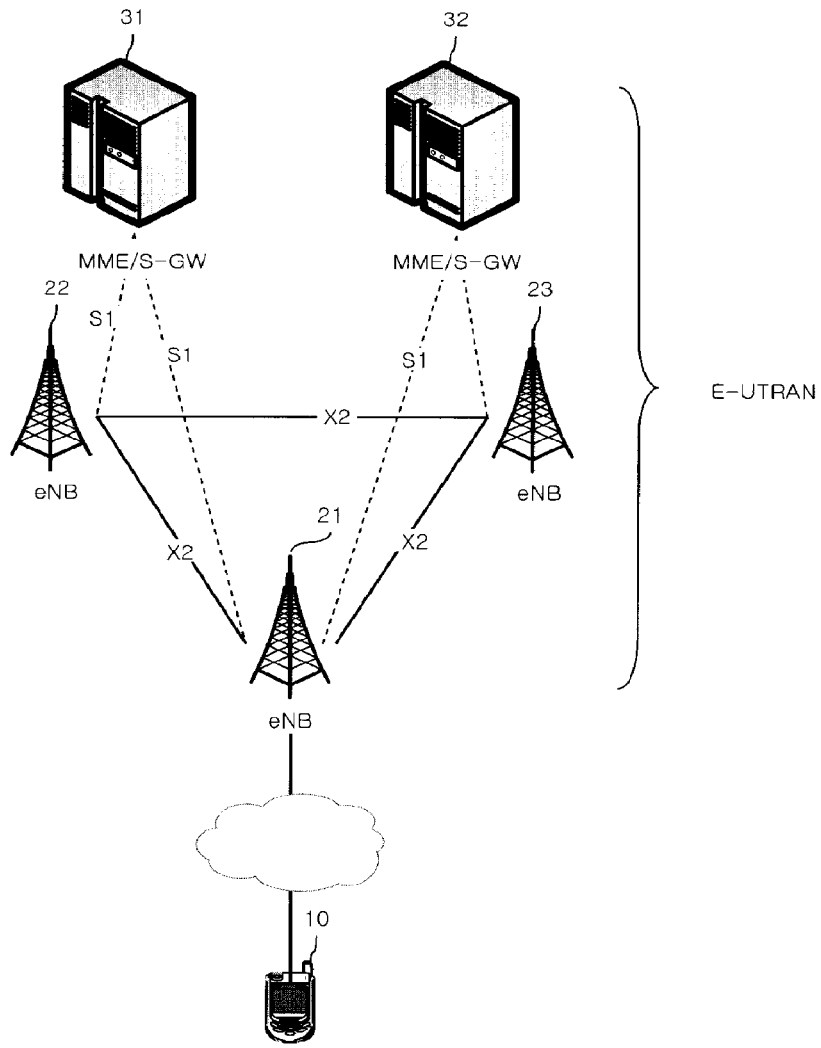
FIG. 1 shows an exemplary network architecture for an E-UMTS (Evolved Universal Mobile Telecommunications System).

FIG. 1 shows the exemplary network architecture for an E-UMTS (Evolved Universal Mobile Telecommunications System), which is a type of mobile communications system that is applicable to the present invention. The E-UMTS system is a system that has evolved from the UMTS system and its basic standardization tasks are now being performed by the 3GPP organization. The E-UMTS system can be said to be a Long Term Evolution (LTE) system (that can also support LTE Advanced technology), which is a type of so-called 4G or next generation system that has evolved from the current 3G mobile communication systems.

The E-UMTS network can be generally distinguished into the E-UTRAN (Evolved Universal Terrestrial Radio Access Network) and the CN (core network). The E-UTRAN is comprised of a mobile terminal 10 (e.g. user equipment (UE), mobile station, handset, mobile phone, etc.), a base station 21, 22, 23 (e.g., an eNode B, access point (AP), network node, etc.) a serving gateway (S-GW) 31, 32 located at an end of the network for connection with an external network, and a mobility management entity (MME) 31, 32 that manages various mobility aspects of the mobile terminal. For a single eNode B, one or more cells (or regions, areas, etc.) may exist.

Figure 2:
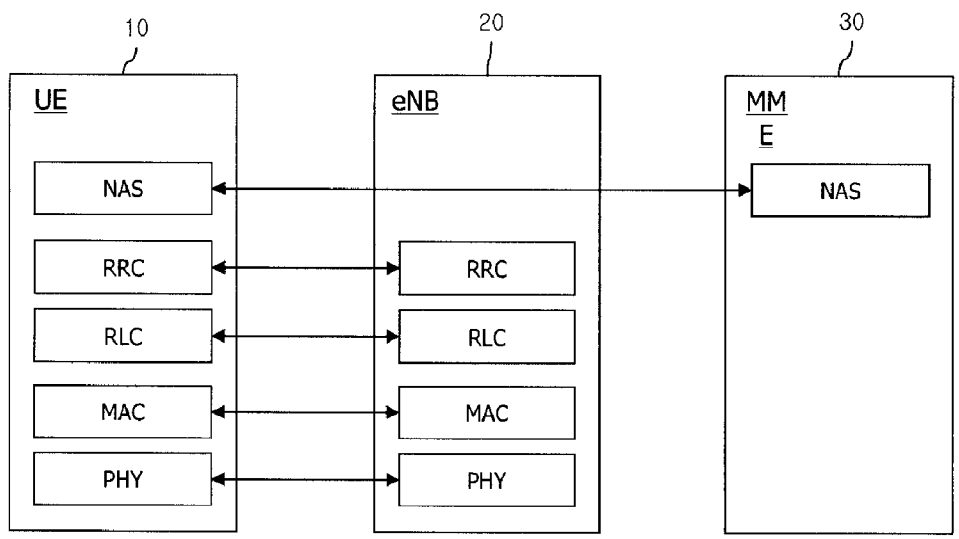
FIG. 2 shows an exemplary radio interface protocol architecture for the control plane between the mobile terminal (UE) and the network (eNB, MME).
Figure 3:
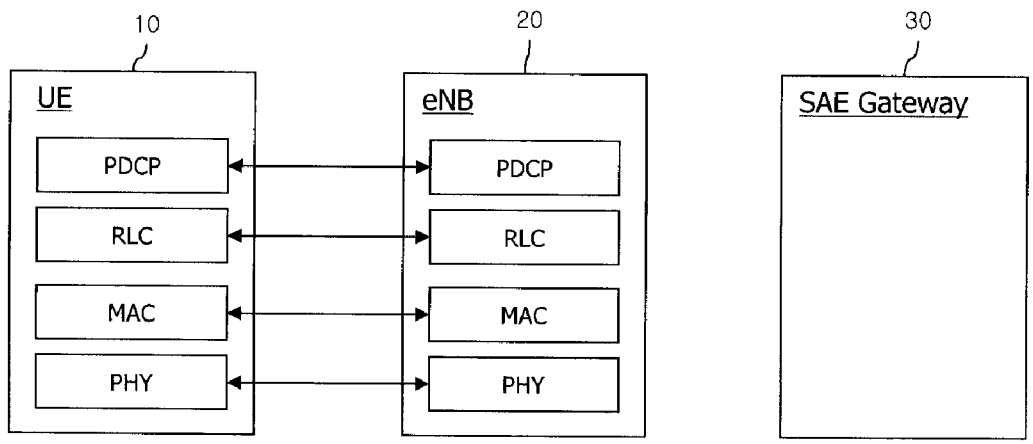
FIG. 3 shows an exemplary radio interface protocol architecture for the user plane between the mobile terminal (UE) and the network (eNB, SAE Gateway).

FIGS. 2 and 3 show the radio interface protocol between the mobile terminal (UE 10) and base station (eNB 20) (and the MME/SAE Gateway 30) based on the 3GPP radio access network standard. This radio interface protocol is divided horizontally into a physical layer, a data link layer, and a network layer, and is divided vertically into a user plane for transmitting data information and a control plane for transferring control signals (signaling). These protocol layers can be divided into L1 (Layer 1), L2 (Layer 2), and L3 (Layer 3), which are the lower three layers of the OSI (Open System Interconnection) standard model, which is well known in communication systems.

Hereafter, the control plane of the radio protocol in FIG. 2 and the user plane of the radio protocol in FIG. 3 will be described respectively.

In Layer 1, the physical layer uses one or more physical channels to provide an information transfer service. The physical layer is connected to the MAC (Medium Access Control) layer located above via one or more transport channels, and data is transferred between the MAC layer and the physical layer through these transport channels. Also, between respectively different physical layers, such as the physical layer in the transmitter (transmitting side) and the physical layer in the receiver (receiving side), data is transferred via one or more physical channels.

The physical channels that exist for the physical layer in the transmitting side and in the receiving side include: SCH (Synchronization Channel), PCCPCH (Primary Common Control Physical Channel), SCCPCH (Secondary Common Control Physical Channel), DPCH (Dedicated Physical Channel), PICH (Paging Indicator Channel), PRACH (Physical Random Access Channel), PDCCH (Physical Downlink Control Channel) and PDSCH (Physical Downlink Shared Channel) and the like.

In Layer 2, the MAC layer provides service to a RLC (Radio Link Control) layer, which is an upper layer, via one or more logical channels. Based upon the type of information being transmitted, the logical channels can be characterized as control channels that are used to transmit control plane data and traffic channels that are used to transmit user plane data. The control channels include Common Control Channels (CCCH) and Dedicated Control Channels (DCCH). The CCCH is used when messages cannot be transmitted between the UE and eNB via the DCCH, and the DCCH is used when the eNB transmits RRC messages to the UE. The traffic channels include Dedicated Traffic Channels (DTCH), which are used to transmit user data of a particular UE.

The RLC layer supports the transmission of data with reliability. Each radio bearer (RB) guarantees a particular QoS (Quality of Service) and handles the transmission of data associated thereto. In order for the RLC layer to guarantee the QoS that is unique to that RB, one or more RLC entities are provided for each RB. Also, several RLC modes (TM: Transparent Mode, UM: Unacknowledged Mode, AM: Acknowledged Mode) are provided to support various QoS requirements.

The PDCP (Packet Data Convergence Protocol) layer in Layer 2 performs a header compression function to reduce the header size for Internet Protocol (IP) packets that contain relatively large and unnecessary control information such that IP packets (such as for IPv4, IPv6, etc.) may be effectively transmitted over the radio interface having relatively small bandwidth. Also, the PDCP layer is used for performing coding of control plane (C-plane) data, such as RRC messages. The PDCP layer can also perform coding of user plane (U-plane) data.

Located at the uppermost portion of Layer 3, the RRC (Radio Resource Control) layer is only defined in the control plane and is responsible for the control of logical channels, transport channels and physical channels with relation to the configuration, re-configuration and release of radio bearers (RBs). Here, a radio bearer is a service provided by Layer 2 for transferring data between the mobile terminal and E-UTRAN.

Figure 4:
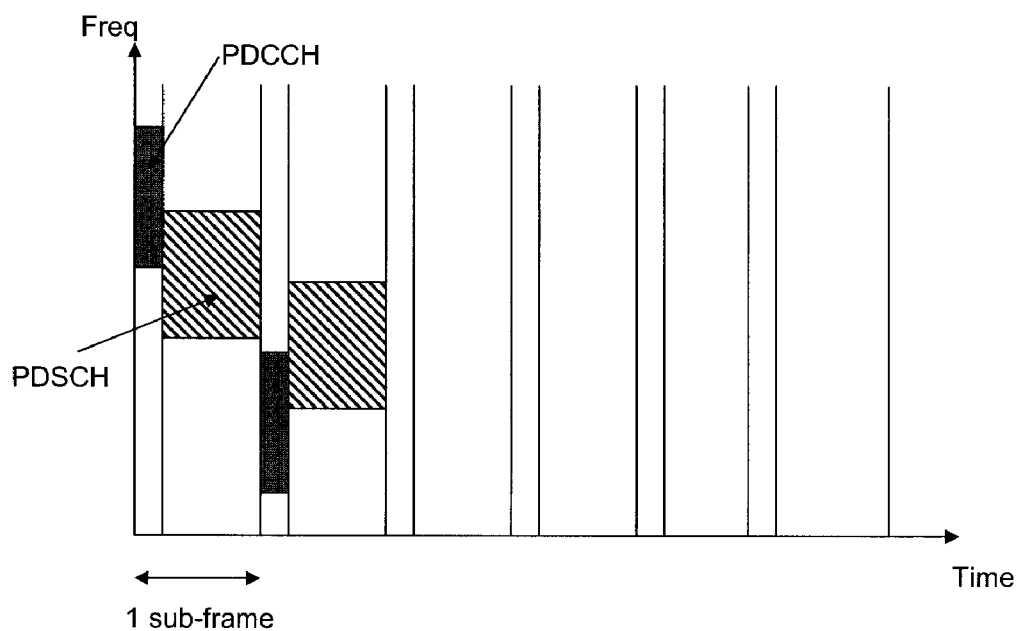
FIG. 4 shows an exemplary signal flow diagram of a contention based random access procedure between the mobile terminal (UE) and the base station (eNB).
Figure 5:
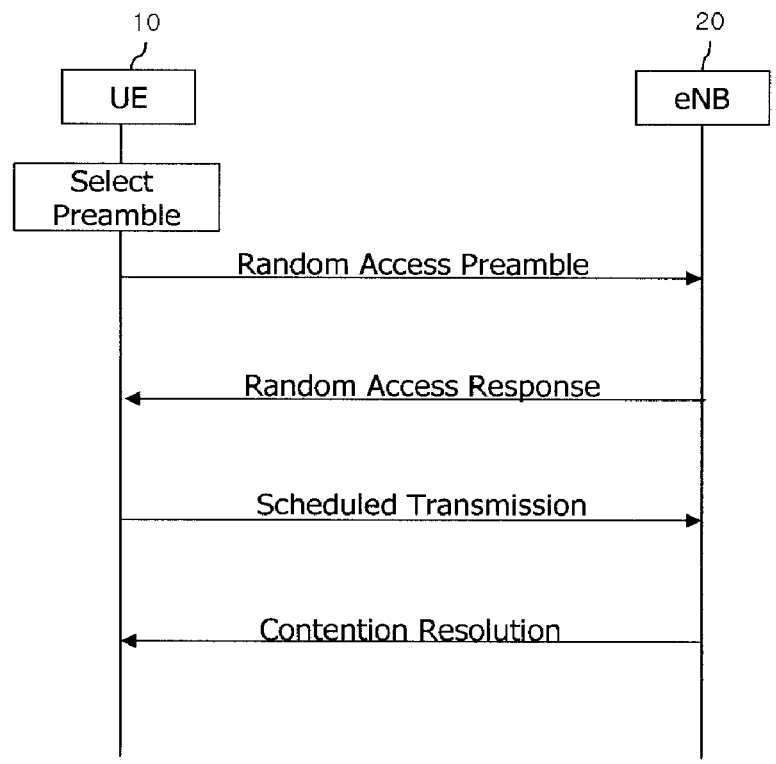
FIG. 5 shows an exemplary relationship among certain channels (PDCCH and PDSCH) between the base station and mobile terminal.

Referring to FIGS. 4 and 5, the procedures for transmitting and receiving data at the physical layer, and the logical channel RACH operations will be explained.

FIG. 4 shows the relationship between physical channels from the eNB to the UE, namely the PDCCH (Physical Downlink Control Channel) and the PDSCH (Physical Downlink Shared Channel).

As can be seen in FIG. 4, on the downlink, there are basically two types of physical channels: PDCCH and PDSCH. The PDCCH is not directly related to transmitting user data, but used in transmitting control information needed for implementing (or using) physical channels. In more basic terms, it can be said that the PDCCH is used in controlling other physical channels. In particular, the PDCCH is used in transmitting information necessary for the mobile terminal to receive the PDSCH. With respect to data that is transmitted at a particular point in time using a particular frequency bandwidth, information about what mobile terminal such data is intended for, the size of such data being transmitted, and the like is transmitted via the PDCCH. Accordingly, each mobile terminal receives the PDCCH at a particular time (TTI: transmission time interval), and checks whether any data that should be received was transmitted. If there is an indication that data (that should be received) was transmitted, the PDSCH is additionally received by using the information (such as the appropriate frequency, etc.) indicated by the PDCCH. It can be said that information indicating as to what mobile terminal (i.e. a single UE or multiple UEs) the data of the PDSCH is being transmitted to, information indicating how the mobile terminal(s) should receive and decode the PDSCH data, and the like are transmitted via a physical channel, i.e. the PDCCH (Physical Downlink Control CHannel).

For example, in a particular sub-frame, let us assume that radio resource information A (e.g. frequency location), transmission format information B (e.g. transmission block size, modulation and coding information, etc.), and RNTI (Radio Network Temporary Identity) information C undergo CRC masking and transmitted via the PDCCH. One or more mobile terminals in a corresponding cell use the RNTI information that it has in order to monitor the PDCCH, and referring to the above assumption, for a mobile terminal having RNTI information C, when the PDCCH is decoded, CRC errors do not occur. Accordingly, such mobile terminal uses the transmission format information B and radio resource information A to decode the PDSCH in order to receive data. In contrast, with respect to the above assumption, in a mobile terminal that does not have RNTI information C, CRC errors occur when the PDCCH is decoded, and thus such mobile terminal does not receive the PDSCH.

Through the above procedures, in order to inform about which mobile terminals have been allocated radio resources, a RNTI (Radio Network Temporary Identifier) is transmitted via each PDCCH, and such RNTI can be classified as a dedicated RNTI or a common RNTI. A dedicated RNTI is allocated to a single mobile terminal and is used for transmitting and receiving data corresponding to that mobile terminal. Such dedicated RNTI is only allocated to those mobile terminals having their information registered in the base station (eNB). In contrast, a common RNTI is used by those mobile terminals that do not have their information registered in the base station (eNB) and cannot be allocated a dedicated RNTI, in order to send and receive data with the base station or used for transmitting information (such as system information) that is commonly applied to a plurality of mobile terminals.

As described above, the two main elements that comprise the E-UTRAN are the base station and the mobile terminal. The radio resources for a single cell are comprised of uplink radio resources and downlink radio resources. The base station is responsible for the allocation and control of uplink radio resources and downlink radio resources of a cell. Namely, the base station determines what radio resources are to be used by what mobile terminals at certain moments in time. For example, the base station can determine that 3.2 seconds from now, the frequency from 100 Mhz to 101 Mhz will be allocated to user 1 for a duration of 0.2 seconds to allow downlink data transmissions. Also, after the base station makes such determination, these matters can be informed to the corresponding mobile terminal such that this mobile terminal receives downlink data. Likewise, the base station can determine when a certain mobile terminal should use what amount of which radio resources for data transmission via the uplink, and the base station informs the mobile terminal about its determination, to thus allow the mobile terminal to transmit data during the determined time period using the determined radio resources.

FIG. 5 shows a signal flow diagram of a contention based random access procedure between the UE and the eNB.

With reference to FIG. 5 and before explaining the random access procedure using the random access channel (RACH), some aspects regarding the RACH will be explained.

The RACH channel is used for transmitting relatively short length data via the uplink. In particular, the RACH and RACH procedure are used when there is a signaling message or user data to be transmitted via the uplink by a mobile terminal that did not receive allocation of dedicated radio resources, or may also be used when the base station should instruct the mobile terminal to perform a RACH procedure.

The random access procedure provided in the LTE system can be classified as a contention based random access procedure and a non-contention based procedure. Such classification is based upon whether the random access preamble is selected by the mobile terminal itself (i.e. preamble selected by the MAC in the mobile terminal) or selected by the base station (i.e. receiving information about the preamble to be used through explicit signaling).

In a non-contention based random access procedure, the mobile terminal uses the preamble that was directly allocated to it from the base station. Thus, if the base station had allocated a particular random access preamble to the mobile terminal, such random access preamble is only used by that mobile terminal, while other mobile terminals do not use such random access preamble. Accordingly, because there is a one-to-one (1:1) relationship between the random access preamble and the mobile terminal that uses such random access preamble, there are no contentions (or conflicts) between multiple mobile terminals. In such case, upon receipt of such random access preamble, the base station can immediately know which mobile terminal transmitted such random access preamble, and thus it can be said that more efficient operation is possible.

In contrast, for a contention based random access procedure, because the mobile terminal sends transmission upon selecting a particular random access preamble among those that may be used, there is the possibility that multiple mobile terminals use the same random access preamble. Thus, even upon reception of a particular random access preamble, the base station cannot accurately know which mobile terminal transmitted on such random access preamble.

The mobile terminal performs a random access procedure for at least the following exemplary situations:
  upon performing an initial access when there is no radio resource control (RRC) connection with the base station;
  upon initial access to a target cell while the mobile terminal is in handover;
  upon request by a command of the base station;
  upon generation of data for the uplink, when uplink time synchronization is not correct or when designated radio resources to be used in appropriate requesting radio resources have not yet been allocated;
  during a correction (e.g. decoding, reconstruction, etc.) procedure when there is a radio link failure or handover failure.

Based upon the above explanations, the operations between the mobile terminal and the base station for a contention based random access procedure are shown in FIG. 5 (including steps 1 through 4).

Step 1)

In a contention based random access procedure, the mobile terminal selects (e.g. at random) one random access preamble among a set of random access preambles indicated via system information or a handover command, then selects PRACH resources that can be used to transmit such random access preamble, and then performs transmission. Here, such preamble is called a RACH MSG 1. When the mobile terminal itself ("randomly") selects the preamble (i.e. the preamble selected by the MAC itself), such is called a contention-based RACH procedure, and the preamble is called a contention-based preamble. If the mobile terminal receives allocation of the preamble directly from the network through the RRC or PDCCH (i.e. an explicitly signaled preamble), this is called a non-contention based RACH procedure, and such preamble is called a dedicated preamble.

Step 2)

After transmitting the random access preamble as selected above, the mobile terminal attempts to receive its random access response (RAR) within a random access response reception window indicated from the base station via system information or handover command. In more detail, the random access response information (typically called a RACH MSG 2) is transmitted in the form of a MAC PDU, which is delivered via the PDSCH, and the information related to the radio resources for the PDSCH is delivered through the PDCCH via the RA-RNTI.

The random access response includes values comprising a random access preamble identifier (ID), a UL Grant (for uplink radio resources), a Temporary C-RNTI (a temporary cell identifier), and a Time Alignment Command (a value for time synchronization adjustment).

If the random access preamble identifier (ID) is the same as (i.e. matches) the random access preamble transmitted in step 1) above, especially while a contention based random access preamble procedure is in progress, the mobile terminal uses the information related to the uplink radio resources and performs the following step 3). If a dedicated preamble is used in step 1), and if the random access preamble identifier (ID) included in RACH MSG 2 and the random access preamble transmitted by the mobile terminal in step 1) are the same (i.e. matches), the RACH procedure is considered to be ended or terminated.

In the above procedure, the random access response is indicated through the RA-RNTI.

Step 3)

If the mobile terminal receives a random access response that is meant for itself (i.e. a valid response), the information within such random access response is processed, respectively. Namely, the mobile terminal applies the Time Alignment Command and stores the Temporary C-RNTI. Also, the UL Grant is used to transmit the data stored in its buffer or to transmit newly generated data to the base station. Here, the data transmitted by using the UL Grant, i.e., the MAC PDU, is commonly denoted as RACH MSG 3. Among the data (i.e. RACH MSG 3) included in the UL Grant, the mobile terminal identifier (ID) must be included. This is because in a contention based random access procedure, the base station cannot determine which mobile terminal performed such random access procedure, and in order to prevent or resolve any future contentions or conflicts, information that can be used to identify the mobile terminal would be required.

In the above procedure, there are two ways to include the identifier for the mobile terminal. For the first way, if the mobile terminal already has a valid cell identifier (C-RNTI) allocated from the base station (eNB) of the corresponding cell before the random access procedure is performed, the mobile terminal transmits such cell identifier via the UL Grant. For the second way, if the mobile terminal did not receive allocation of a unique cell identifier from the eNB, the mobile terminal includes its core network identifier (e.g., S-TMSI, Random ID, etc.) and performs transmission. After transmitting data using the UL Grant, the mobile terminal starts a contention resolution timer in order to solve any contention (conflict) problems.

Step 4)

After transmitting data (that includes its identifier) using the UL Grant included in the random access response, the mobile terminal waits for commands from the base station for resolving contentions. Namely, reception of the PDCCH is attempted in order to receive a particular message. There are two ways to receive the PDCCH. As stated previously, if the identifier transmitted by using the UL Grant is a cell identifier (C-RNTI) allocated to the mobile terminal from the eNB, the mobile terminal attempts reception of the PDCCH by using its cell identifier, and if the identifier is an identifier that was allocated through the core network, attempt to receive the PDCCH is performed by using the Temporary C-RNTI included in the random access response.

Afterwards, for the former case (i.e. C-RNTI), if the PDCCH (referred to a RACH MSG 4 hereafter) is received (by using its cell identifier) before expiration of the contention resolution timer, then it is considered that the mobile terminal performed the random access procedure in a normal manner and the random access procedure is ended (terminated). For the latter case (i.e. Temporary C-RNTI), if the PDCCH was received through the temporary cell identifier before expiration of the contention resolution timer, the data (referred to as RACH MSG 4 hereafter) delivered by the PDSCH, which is indicated by the PDCCH, is checked. If such data contains a unique identifier for the mobile terminal itself, it is considered that the mobile terminal performed the random access procedure in a normal manner, and the random access procedure is ended (terminated). The message or MAC PDU received in this step 4) is commonly called RACH MSG 4.

Step 5)

In case the contention resolution timer has expired (i.e., a Temporary C-RNTI or a cell identifier for the mobile terminal is not received before expiration of the contention resolution timer), the mobile terminal considers the RACH procedure to be a failure. As a result, an appropriate back-off timer is operated (started) and the RACH procedure beginning from step 1) above is started again after expiration of such back-off timer.

The concepts and features of the present invention can be explained as follows:

If a recipient of a certain MAC PDU is evident to every UE, the format of the PDU can be made arbitrary or can be specific to that UE. For example, if a MAC PDU is transmitted to a Rel-9 UE via dedicated C-RNTI over PDCCH, the Rel-9 eNB can use Rel-9 specific MAC PDU format for that. Due to use of dedicated C-RNTI, other Rel-8 UEs will not decode that MAC PDU and there is no problem.

Namely, if a UE dedicated identifier (such as C-RNTI) is used, the MAC PDU transmitted via the C-RNTI can be sent upon considering the version (i.e. release number) of the UE. In other words, the eNB can know about which UEs that the C-RNTI was allocated to, and the radio resources indicated by the C-RNTI are used by the UE that received allocation of such C-RNTI. Thus, in such case, transmission of a MAC PDU that is appropriate to the version (or release) of the UE is possible.

But if a recipient of a certain MAC PDU is not clear, the format of the PDU should be clear to every UEs. This is the case when a MAC PDU is transmitted via common RNTI such as T-C-RNTI or RA-RNTI. Because both Rel-8 UEs and Rel-9 UEs may receive a MAC PDU over common RNTI, the format of the MAC PDU should be understood by every UEs. If a Rel-9 eNB transmit a Rel-9 MAC PDU format and the version of the MAC PDU format is not known to the UEs, Rel-8 UEs will decode the message incorrectly using Rel-8 MAC PDU format.

However, if the MAC PDU is transmitted via a common control channel, such MAC PDU is received by a plurality of UEs, and if the versions of these UEs are different, problems may occur. For example, in case a MAC PDU constructed in Rel-9 format is transmitted via the common control channel, if the Rel-8 format and the Rel-9 format are different, the Rel-8 UE cannot understand Rel-9 formats defined after such UE was released on the market. Thus, even upon receipt of such MAC PDU, such cannot be properly decoded and problems will occur.

The easiest way to resolve such problem is to unify the random access response format for all types of releases (or versions) of UE. However, in such case, if new RACH procedures are to be defined for later or subsequent release UEs, additional or new information for the ransom access response message cannot be included, and thus problems will occur because the capabilities for later releases or versions of RACH procedures cannot be improved.

Accordingly, the features of the present invention were conceived to solve such problems related to random access response messages transmitted via a common channel, such that UEs of different versions (releases) can receive and process such messages without any problems.

The first way of achieving this is to allocate respectively different preambles for each release (or version) of UEs. This may be referred to as a method of performing "preamble grouping" in a particular manner. Currently, the RACH preambles are defined from 1 through 64. Thus, for example, 1 through 50 may be allocated for Rel-8 UEs, while 51 through 64 may be allocated for Rel-9 UEs. Surely, other ways of dividing or grouping the particular range of usable RACH preambles for different types, versions, or releases of UEs can be contemplated and implemented. Such information (i.e. grouping) can be delivered through system information (such as via a System Information Block: SIB).

If the preambles are grouped and divided according to the release (or version) of the UEs, in the above example, a Rel-8 UE can select a RACH preamble among 1 through 50 and use such to perform its RACH procedure, while a Rel-9 UE can select a RACH preamble among 51 through 64 and use such to perform its RACH procedure. Accordingly, if the base station (eNB) receives a RACH preamble among 1 through 50, the random access response format for version Rel-8 is used in transmitting the random access response. If a RACH preamble among 51 through 64 is received, the random access response format for version Rel-9 is used in transmitting the random access response. As such, a response message that is appropriate for each respective UE can be transmitted.

In the above procedure, the base station (eNB) can inform, by use of system information, as to whether a random access response of Rel-9 version is being transmitted or not. In such case, a Rel-9 version UE uses a Rel-9 preamble only in case the base station (eNB) supports Rel-9 version response, while in other cases, the RACH procedure is performed as with other Rel-8 version UEs.

The above method may be extended (or further modified) in various ways. Currently, the standardization for LTE-Advanced is being performed. As LTE-Advanced is an extension of LTE technology, its RACH procedures can be similarly defined and implemented. Thus, assuming that a certain UE supports LTE-Advanced technology, and if a certain cell supports LTE-Advanced RACH procedures, then the certain UE employs the preamble(s) allocated for LTE-Advanced use. Also, within the same cell, a UE supporting LTE employs the preamble(s) allocated for LTE use. In such manner, the base station (eNB) can know about what UE performed a random access procedure, what technology is support by that UE which performed the random access procedure, what version (or release) UE performed the random access procedure, and the like such that an appropriate response can be provided thereto.

Regarding some of the effects of the present invention, various mobile terminal can receive random access messages that are appropriate for their mobile communication systems. As such, unnecessary signaling of the related art can be avoided, while waste of radio resources can be minimized. Also, failures in random access procedures can be reduced, and thus the limited number of random access preamble can be effectively used. Accordingly, a plurality of mobile terminal managed by a base station can complete their random access procedures quickly and effectively.

The various exemplary embodiments of the present invention will be explained in more detail below.

Figure 6:
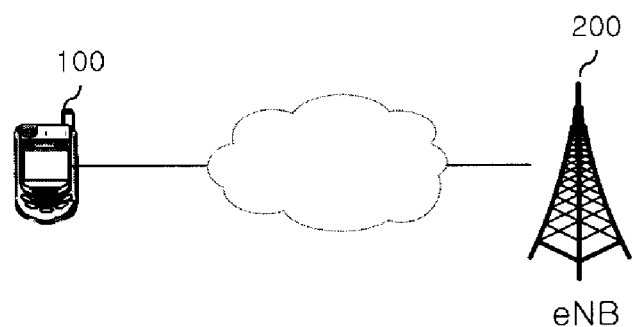
FIG. 6 shows a UE 100 and an enhanced Node B (eNB) 200 of the present invention.
Figure 7:
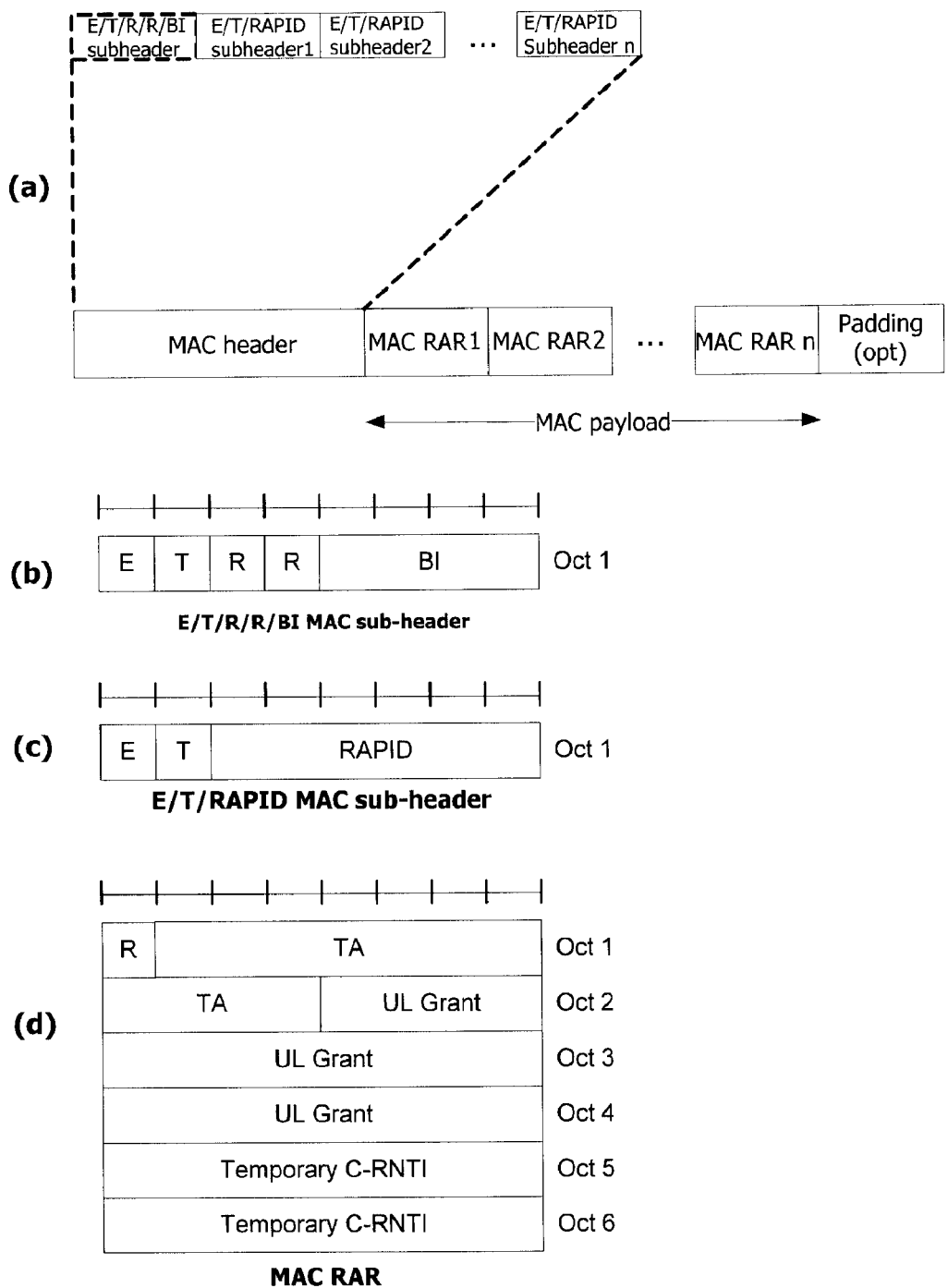
FIG. 7 shows the exemplary structure of a random access response message sent and received between the UE 100 and the eNB 200.

FIG. 6 shows a UE 100 and an enhanced Node B (eNB) 200 of the present invention, while FIG. 7 shows the exemplary structure of a random access response message sent and received between the UE 100 and the eNB 200.

The UE 100 sends a random access preamble (RACH MSG 1) to the eNB 200, and receives a random access response message (RACH MSG 2) having the format shown in FIG. 7 from the eNB 200.

FIG. 7 shows a random access response message having a Release 8 format according to LTE standard, but the concepts of the present invention are not meant to be limited to such.

FIG. 7(a) shows a MAC PDU (Protocol Data Unit) of a random access response message.

The MAC PDU comprises a MAC header, a MAC payload, and MAC PDU padding may also be included.

The MAC header can have a variable size, and can include one or more sub-headers.

Among these sub-headers, the first sub-header may be a E/T/R/R/BI MAC sub-header, while the second sub-header may be a E/T/RAPID MAC sub-header.

FIG. 7(b) shows that the E/T/R/R/BI MAC sub-header comprises an E field, a T field, an R field, and a BI field. Each field can be described as follows:

E: The Extension field is a flag indicating if more fields are present in the MAC header or not. The E field is set to "1" to indicate at least another set of E/T/RAPID fields follows. The E field is set to "0" to indicate that a MAC RAR or padding starts at the next byte;

T: The Type field is a flag indicating whether the MAC subheader contains a

Random Access ID or a Backoff Indicator. The T field is set to "0" to indicate the presence of a Backoff Indicator field in the subheader (BI). The T field is set to "1" to indicate the presence of a Random Access Preamble ID field in the subheader (RAPID);

R: Reserved bit, set to "0"; and

BI: The Back-off Indicator field identifies the overload condition in the cell. The size of the BI field is 4 bits.

FIG. 7(c) shows that the E/T/RAPID MAC sub-header comprises an E field, a T field, and a RAPID field. Here, the RAPID field is a Random Access Preamble Identifier (ID) field that identifies the transmitted Random Access Preamble. The size of the RAPID field is 6 bits.

It should be noted that the MAC header and subheaders are octet aligned.

The MAC payload may comprise one or more MAC RAR (random access response) elements.

FIG. 7(d) shows that the MAC RAR may be comprised of an R field, a TA (Timing Advance) field, a UL Grant field, and a Temporary C-RNTI field.

Figure 8:
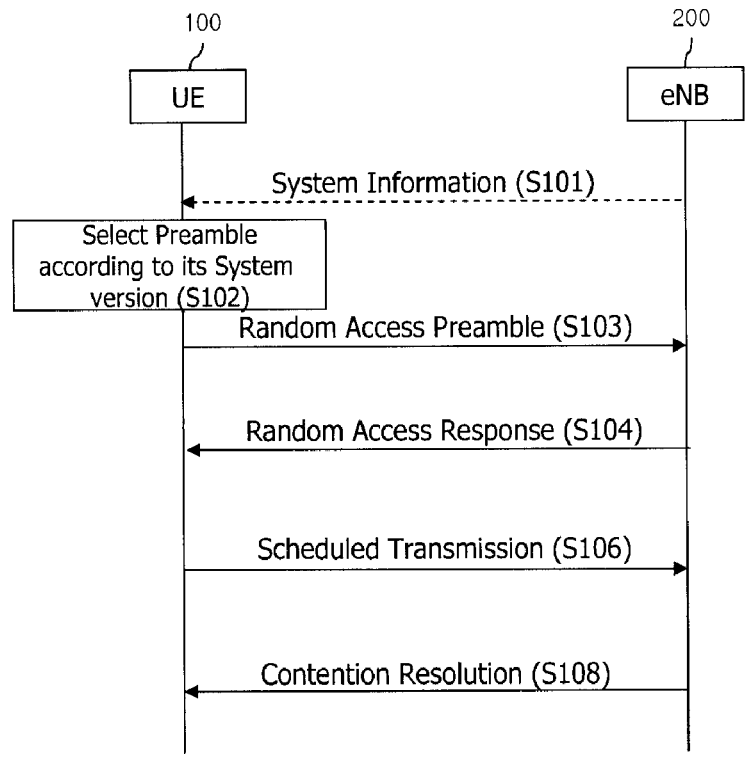
FIG. 8 shows an exemplary signal flow diagram for a first embodiment.

FIG. 8 shows an exemplary signal flow diagram for a first exemplary embodiment.

In the first embodiment, the preambles may be grouped together according to each type of system version (e.g. Release 8 vs. Release 9; LTE vs. LTE Advanced, etc.). Here, the preambles are grouped into two types merely for the sake of explanation, but it can be understood that any number of groupings are possible. In this example, among the set of preambles, a first set may be used for Release 8 (Rel-8), while a second set may be used for Release 9 (Rel-9). Likewise, a first set may be used for LTE, while a second set may be used for LTE Advanced. Here, the eNB 200 provides the UE 100 with information about such preamble groupings.

The eNB 200 performs grouping of the random access preambles according to the system versions or random access response (RAR) formats (or on some other basis) and information about the mapping relationship of such groups is sent to the UE 100 (S101). Such group mapping information may be sent together with system information transmitted by the eNB 200, and such system information can be transferred in the form of one or more system information blocks (SIBs). As one example of how preambles may be grouped, assuming that there are preambles 0 through 63, the eNB 200 may allocate preambles 0 through 49 for UEs that support Release 8 (or for UEs that support Normal RAR (Random Access Response) format), while preambles 50 through 63 may be allocated for UEs that support Release 9 (or for UEs that support Extended RAR (Random Access Response) format).

The UE 100 receives the information about the group mappings, and is able to select a preamble that is appropriate for its system version (or standard/format support capabilities) (S102). For example, a UE that supports Release 8 will select one of among preambles 0 through 49, while, a UE that supports Release 9 will select one of among preambles 50 through 63.

The eNB 200 receives a random access preamble (S103) and using such random access preamble and the group mapping information, checks the system version supported by the UE 100, and generates the appropriate random access response message, which is sent to the UE 100 (S104). For example, if the eNB 200 receives a preamble between 0 through 49, the random access response message is generated according to the random access response Rel-8 version format, and if the eNB 200 receives a preamble between 50 through 63, the random access response message is generated according to the random access response Rel-9 version format. Thereafter, the random access response generated according to the appropriate format is sent to the UE 100.

Then, the UE 100 receives the random access response corresponding to its system version (or supported standard) and proper decoding thereof can be performed. As a result, the UE 100 can transmits its data according to the UL Grant included within the received random access response message (S106). Thereafter, contention resolution by the eNB 200 may be performed (S108).

Meanwhile, the eNB 200 may inform the UE 100, via system information, about whether a random access response according to its system version (such as Release 9) is transmitted or not. In such case, for a UE 100 supporting Release 9, a Rel-9 preamble will be used upon checking that the eNB 200 supports Release 9; otherwise, the random access procedure can be performed as with the case of a Rel-8 version UE.

As such, in the first embodiment, based on the received preamble, because the eNB 200 can know about the particular UE that sent such preamble, and also knows about the technology used by the UE, as well as the version supported by the UE, an appropriate format for the random access response message an be transmitted.

Figure 9:
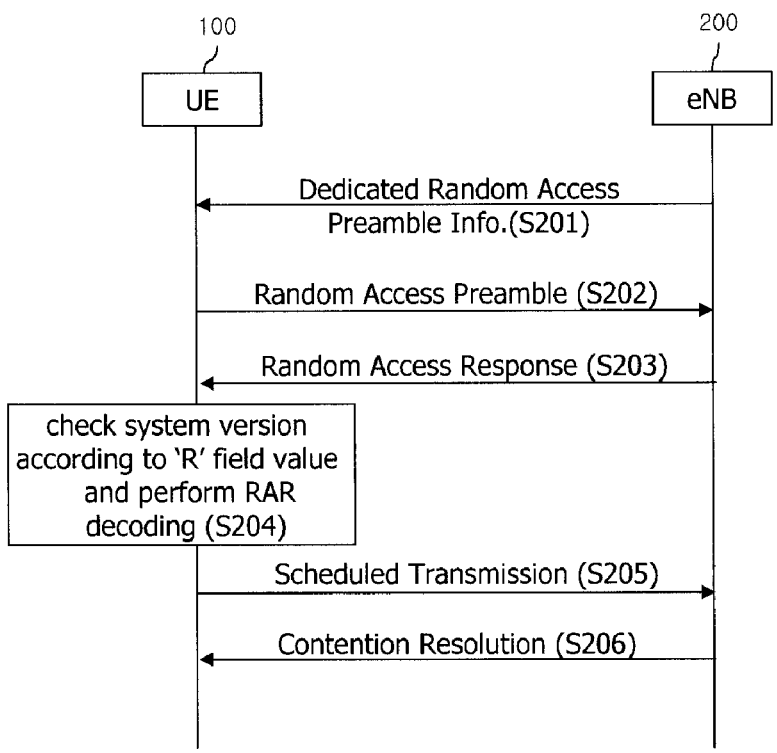
FIG. 9 shows an exemplary signal flow diagram for a second embodiment.

FIG. 9 shows an exemplary signal flow diagram for a second exemplary embodiment.

As the second embodiment has similar features to those in the first embodiment, only the differences thereof will be explained.

In the second embodiment, the eNB 200 can allocate a common preamble or a dedicated preamble based upon the system version or random access response format. For example, the eNB 200 can allocate common preambles to those UEs that support Release 8, while dedicated preambles can be allocated to those UEs that support Release 9. Namely, only those UEs that use a random access response having an extended format (i.e. Extended RAR format) can receive allocation of a dedicated preamble.

The eNB 200 transmits to the UE 100 (S201) information related to the dedicated preamble (i.e. information related to a dedicated random access preamble such as system version, RAR format that is supported, etc.). Such information may be sent to the UE 100 together with system information.

The UE 100, if supporting Release 9, sends a dedicated preamble to the eNB 200 (S202), which verifies that the UE 100 supports Release 9 from the received dedicated preamble, and then sends to the UE 100 a random access response message corresponding to Release 9 format.

Upon receiving the random access response message, the UE 100 checks whether the random access preamble (included in the received random access response message) matches the random access preamble that it previously transmitted, and if so, the random access response message is decoded according to the system version associated with the dedicated preamble (S204). Thereafter, procedures for scheduled transmission (S205) and contention resolution (S206) may be performed.

This second embodiment may be further modified in many ways. For example, the eNB 200 may characterize the dedicated preambles into a first set and a second set (or any other type of grouping) according to the system version or random access response format, or based upon some other category. In more detail, for a UE that supports Release 8, a dedicated preamble can be recognized without having to characterize the dedicated preambles into first and second sets, but a UE that supports Release 9 can recognize whether the dedicated preamble is part of the first set or the second set.

As another alternative, when a call or RRC connection is established with the UE 100, the eNB 200 may use RRC signaling (or other types of message transmissions or instructions) to inform about whether Rel-8 format or Rel-9 format should be used. If the UE 100 receives allocation of a dedicated preamble from the eNB 200, when a response with respect to such preamble transmission is received, the appropriate format informed from the eNB 200 is used to decode the MAC PDUs in the received response. For example, when the eNB 200 informs the UE 100 via RRC signaling that a Rel-9 random access response is being transmitted, the UE 100 sends a dedicated preamble and upon receiving a response thereto, the Rel-9 format is used for decoding.

Figure 10:
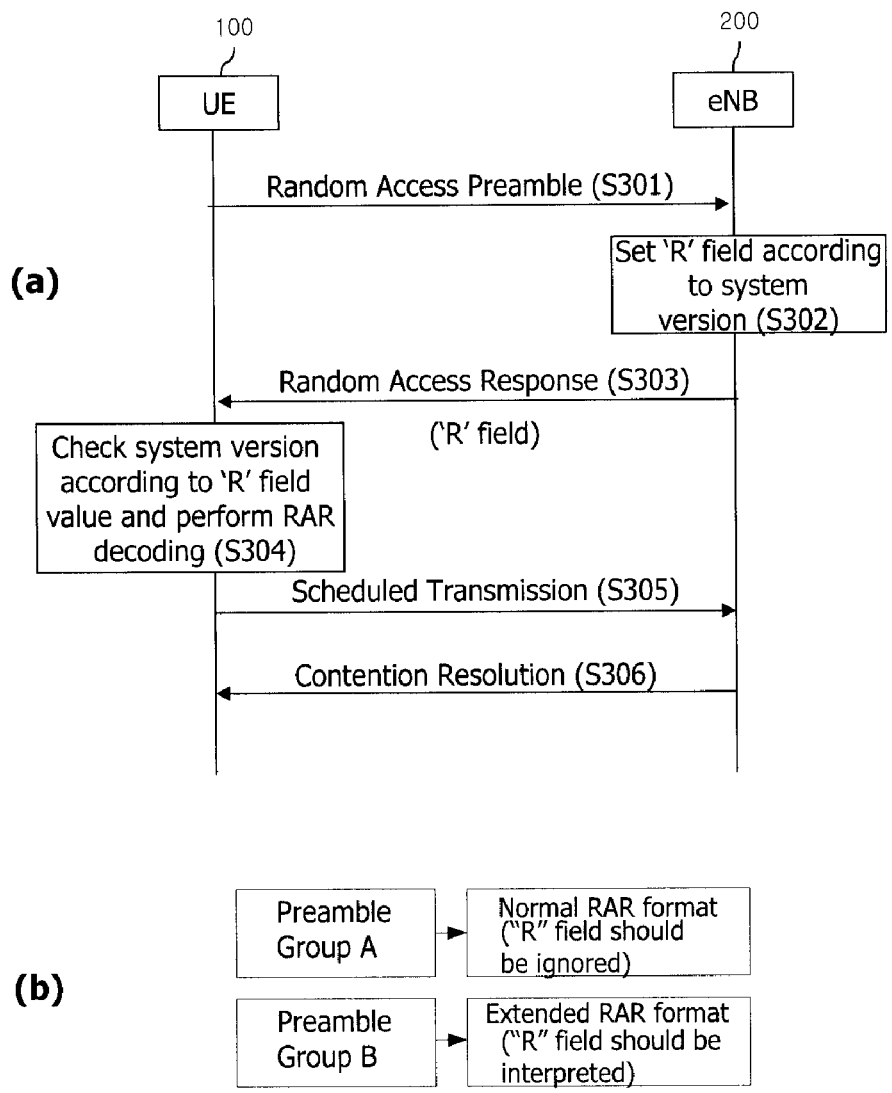
FIG. 10 shows an exemplary signal flow diagram for a third embodiment.

FIG. 10 shows an exemplary signal flow diagram of a third exemplary embodiment.

According to the third embodiment, upon receiving a random access preamble (S301), the eNB 200 sets an R field in the MAC RAR shown in FIG. 7 according to the system version type (e.g. Release 8 or Release 9), supported standard type (e.g. LTE or LTE Advanced) or the like (S302). For example, the R field in the RAR message being set as "0" indicates that the random access response message is of Release 8 format (or so-called Normal format), and, the R field in the RAR message being set as "1" indicates that the random access response message is of Release 9 format (or so-called Extended format).

The UE 100 checks the R field of the random access response message to determined the system version, and performed decoding of the random access response message accordingly (S304). Here, if a UE supporting Release 8 receives a random access response message having its R field set to "1", such R field may be ignored. Alternatively, a UE 100 supporting Release 8 may ignore the random access response message itself regardless of how the R field was set.

In contrast, if a UE 100 supporting Release 9 receives a random access response message having its R field set to "0", such random access response message will be decoded by using Release 8 format. Also, if the UE 100 supporting Release 9 receives a random access response message having its R field set to "1", such random access response message will be decoded by using Release 9 format.

The third embodiment may also be modified in a variety of ways. For example, certain features of the first embodiment may be added into the third embodiment. Namely, as shown in FIG. 10, among the set of preambles, the preambles 0 through 49 can be grouped as Group A for Release 8, while the preambles 50 through 63 can be grouped as Group B for Release 9. If the UE transmitted a preamble selected from Group A, and when a random access response having its R field set is received in accordance with the third embodiment, such random access response may be ignored. However, if the UE transmitted a preamble selected from Group B, and when a random access response having its R field set is received in accordance with the third embodiment, such random access response is decoded according to whether the R field was set to 0 or 1.

Meanwhile, the third embodiment may also be combined with the second embodiment. For example, a dedicated preamble may be allocated to a Release 9 UE, and the random access response may be decoded according to the R field value being set as 0 or 1.

Figure 11:
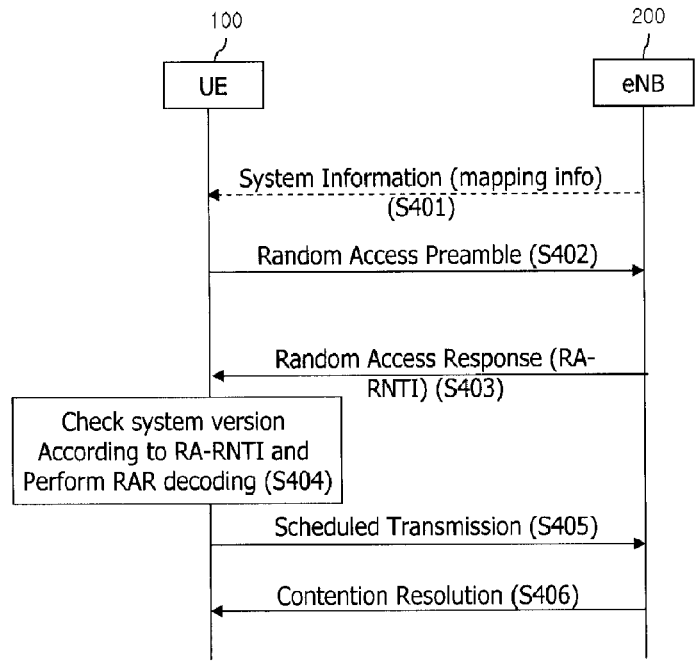
FIG. 11 shows an exemplary signal flow diagram for a fourth embodiment.

FIG. 11 shows an exemplary signal flow diagram of a fourth exemplary embodiment.

In this fourth embodiment, a Random Access RNTI (RA-RNTI) is used to distinguish between the random access response formats according to the system version, supported standard, or other criteria.

The eNB 200 uses system information to inform about the RA-RNTI used for transmitting a random access response to a Rel-8 UE or the RA-RNTI used for transmitting a random access response to a Rel-9 UE (S401).

Thus, after transmitting a preamble (S402), the UE 100 receives a random access response message that includes a RA-RNTI that is appropriate for its system version (S403). Also, the UE 100 uses the random access response format corresponding to the system version distinguished by the RA-RNTI for decoding to random access response message (or MAC PDU) (S404).

Such fourth embodiment may also be modified. For example, in case of a Rel-9 UE, all RA-RNTIs with respect to each system version are received, and after the MAC PDUs indicated by each RA-RNTI are received, when each PAC PDU is decoded, the RA-RNTI information associated with that MAC PDU is used. In more detail, assuming that if the RA-RNTI received via system information is 2, it can be known that the format of the random access response is related to Release 9. Then, the UE proceeds to decode the MAC PDU of the random access response according to the Rel-9 format.

Meanwhile, the above described third and fourth embodiments, when implemented respectively without any modification, may suffer from some drawbacks in certain situations.

For example, if the UE 100 does not transmit a preamble that is based upon its system version as in the first and second embodiments, the eNB 200 cannot know what system version is supported by the UE 100. Thus, the eNB 200 needs to include both a random access response for Release 8 and also a random access response for Release 9 into the MAC PDU, which is transmitted to the UE 100. Here, in order to distinguish between the random access response for Release 8 and the random access response for Release 9, an R field (as in the third embodiment) or a RA-RNTI (as in the fourth embodiment) may be employed. However, if the length (or size) of the Release 8 random access response and that of the Release 9 random access response are different, a UE supporting Release 8 may not be able to properly decode the random access response. Such issues will be further explained below.

Figure 12:
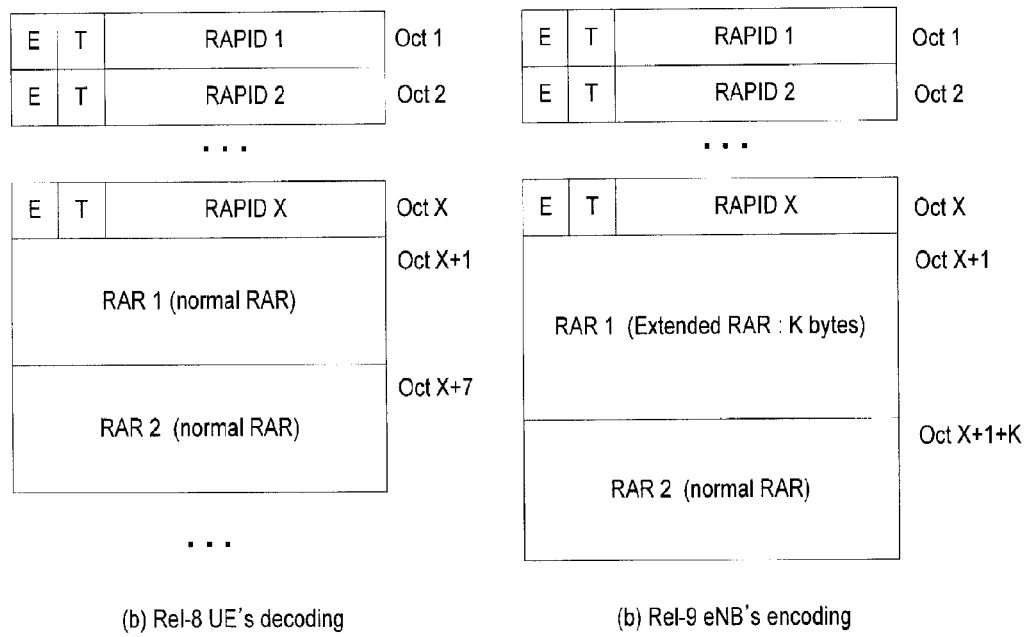
FIG. 12 shows an example where the random access response message formats have respectively different lengths (size).

FIG. 12 shows an example where the random access response message formats have respectively different lengths (size).

A random access response having a Normal format (i.e. a Release 8 random access response) comprises 6 octets (=6 bytes). However, a random access response having an Extended format (i.e. Release 9 random access response) may or may not be comprised of 6 octets.

Also, when the eNB 200 constructs a MAC PDU (as shown in FIG. 12(b)), the random access response (RAR1) with an Extended format (having K bytes) may be positioned foremost (i.e. at the beginning), while the random access response (RAR2) with a Normal format may be positioned thereafter, in accordance with RAPID1, RAPID2, etc. of the MAC sub-headers.

In such case, even if a MAC PDU containing both the Release 8 random access response (RAR2) and the Release 9 random access response (RAR1), the UE supporting Release 9 is able to properly perform decoding of such MAC PDU.

However, because a Release 8 UE will consider each random access response to have a length of 6 octets, the RAR1 will be assumed to have 6 octets, and at the end of the 6 octets, decoding of the RAR2 will be performed. But, doing so will lead to decoding failures because RAR1 actually may have a length of K bytes, which is not 6 octets.

In order to address such issues, a fifth embodiment is proposed.

Figure 13:
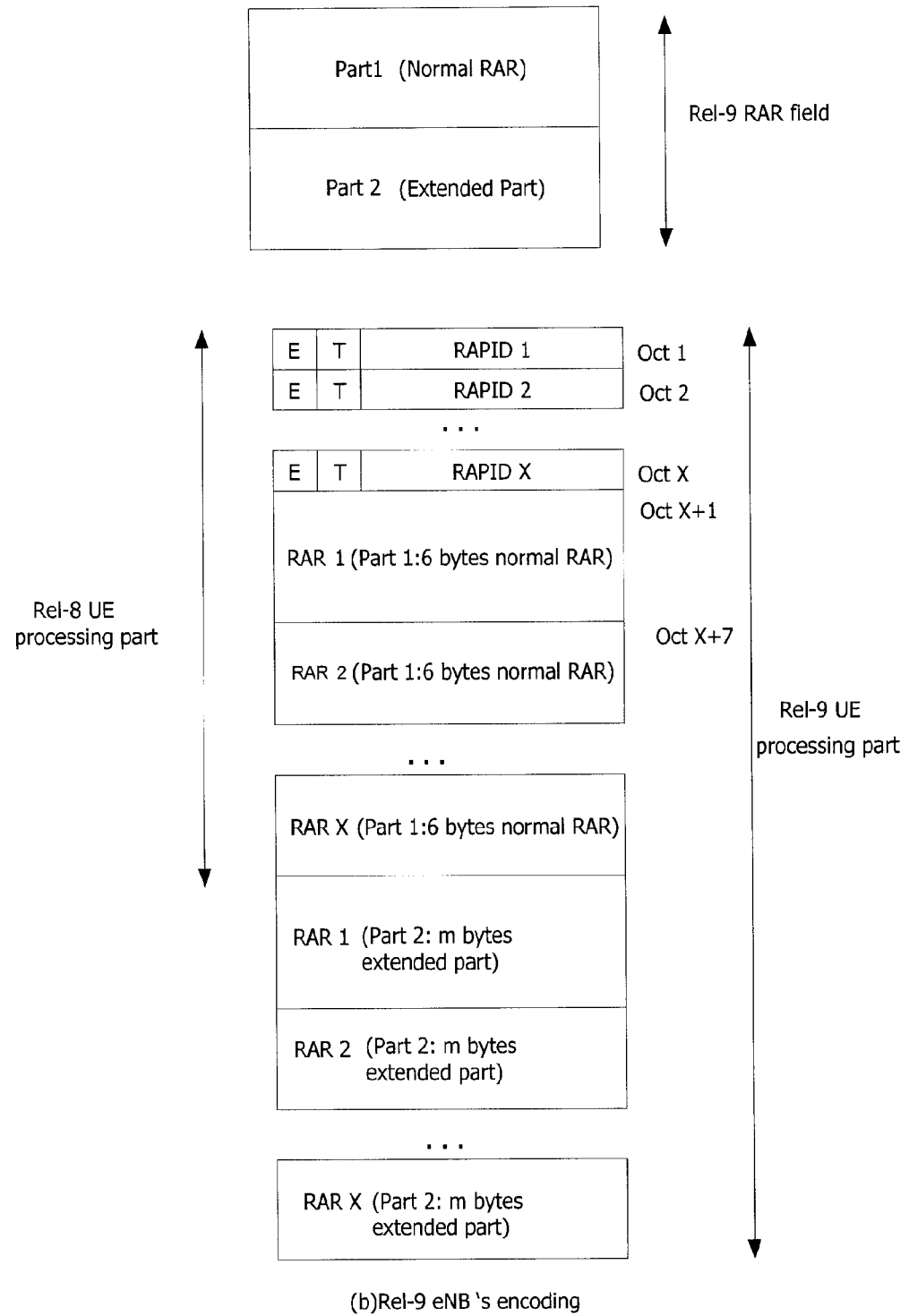
FIG. 13 shows an exemplary signal flow diagram of a fifth exemplary embodiment.

FIG. 13 shows an exemplary signal flow diagram of a fifth exemplary embodiment.

According to the fifth embodiment, the payload of the MAC PDU is separated into two or more parts (or sections). For example, the first part includes Rel-8 random access responses, and the second part includes Rel-9 random access responses. Here, the second part is included after the first part is included. Also, the plurality of Rel-8 random access responses included in the first part have the same sequential order as that of its related RAPID order, while the plurality of Rel-9 random access responses included in the second part have the same sequential order as that of its related RAPID order.

The first part can be decoded by both Rel-8 UEs and Rel-9 UEs, while the second part can be decoded by only Rel-9 UEs. The second part includes information that is newly defined for Rel-9.

Thus, when a Rel-8 UE receives a MAC PDU included in the random access response, if there is a preamble ID that matches that of the preamble it transmitted, the portion in the first part corresponding to its preamble ID is decoded. In contrast, when a Rel-9 UE receives a MAC PDU included in the random access response, if there is a preamble ID that matches that of the preamble it transmitted, both the first part and the second part are decoded. In such case, the existence of the second part can be informed to the UE by the R field of the first part.

Alternatively, the portion that includes additional information for Release 9 may have a pre-set length (or size), which can be informed to the UE. Thus, even if a random access response for Release 9 is located before the random access response for Release 8, a Release 8 UE can refer to the length information to thus properly decode the random access response for Release 8.

Figure 14:
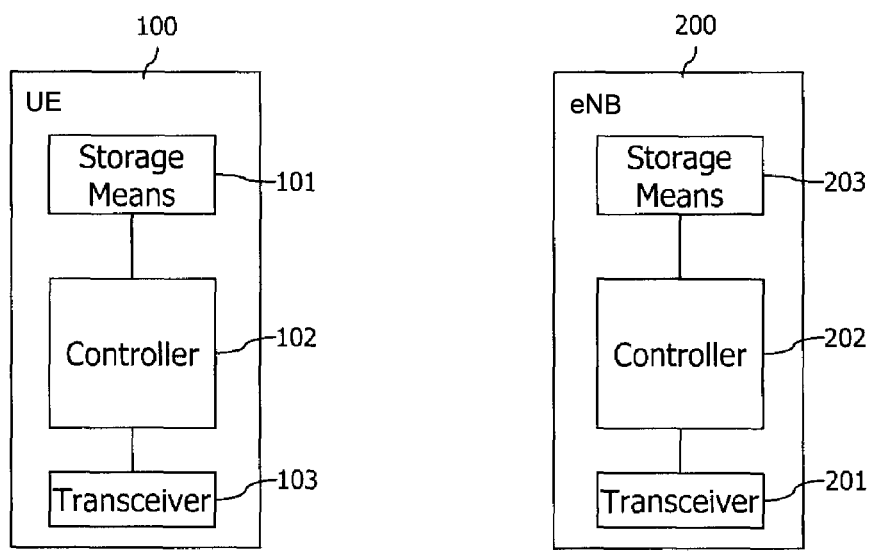
FIG. 14 shows an exemplary block diagram for the UE 100 and eNB 200 that implement the first through fifth embodiments.

FIG. 14 shows an exemplary block diagram for the UE 100 and eNB 200 that implement the first through fifth embodiments.

The UE 100 may have a storage means 101, a controller 102, and a transceiver 103. The eNB 200 may have a storage means 201, a controller 202, and a transceiver 203.

The R field is a value that is included in the MAC RAR, and such value is to be disregarded or ignored by a Rel-8 version UE. However, a Rel-9 version UE can operate in a different manner depending upon how the R field is set. For example, if the UE finds that the R value included in the RAR field of the received random access response message is binary 0, such response (MAC PDU) is to be interpreted as Rel-8 format, while the R value being binary 1 would mean that the MAC PDU is to be interpreted as Rel-9 format.

In the above procedure, let us assume that a preamble needs to be allocated for a UE that supports a later release (or version). In the current Rel-8, there are common preambles and dedicated preambles. Here, because a dedicated preamble cannot be recognized by a Rel-8 UE, at least some of the dedicated preambles can be allocated for use in Rel-9. Namely, a Rel-8 UE will recognize such preamble as a dedicated preamble, but a Rel-9 UE will recognize such preamble as a Rel-9 preamble.

As another method for the present invention, when the base station (eNB) establishes a call with the UE, the fact of whether Rel-8 format will be used or Rel-9 format will be used is informed through RRC signaling. Also, when the UE receives allocation of a dedicated preamble from the base station (eNB), the format indicated from the base station (eNB) is used to receive the response (MAC PDU). For example, if the base station (eNB) informs the UE through RRC signaling that a random access response for Rel-9, and if the UE receives a response with respect to the dedicated preamble it transmitted, such response is decoded (or interpreted) by using the Rel-9 format.

As yet another method, the RA-RNTI may be used to indicate the format associated with the random access response. Namely, the base station (eNB) can use system information to separately distinguish and inform about an RA-RNTI to be used in transmitting a random access response to a Rel-8 UE and an RA-RNTI to be used in transmitting a random access response to a Rel-9 UE. As such, after transmitting a preamble, each UE receives the RA-RNTI that is appropriate for its version (or release). Also, the random access response (RAR) format that is appropriate for each version (or release) is used to decode the received MAC PDU. In case of a Rel-9 UE, all RA-RNTIs corresponding to each version (or release) are received, and after receiving the MAC PDUs indicated by each RA-RNTI, when decoding each MAC PDU, the RA-RNTI associated with such MAC PDU is used. For example, with respect to a received MAC PDU, is RA-RNTI2 was used, and when such RA-RNTI2 was allocated to Rel-9 usage, the UE decodes the MAC PDU by using the RAR format for Rel-9 usage.

However, if the RAR size for each version (or release) is different, the following problems may occur. For example, assume that a Rel-8 UE uses RAPID 2. But, depending upon whether the response with respect to RAPID 1 is for Rel-8 version or for Rel-9 version, the octet number for the start of RAR 2 will be different. Thus, in order to avoid such problems, all of the RARs with respect to Rel-8 version are included (or added) first, and thereafter, the RARs for Rel-9 version should be included. Namely, when constructing a MAC PDU, the RARs for Rel-9 are located after (pr behind) the RARs for Rel-8.

FIG. 12 shows another exemplary method according to the present invention. Here, the RAR is divided into two portions; the first portion including information for Rel-8 and the second portion including information for Rel-9. The second portion is included (added) after the first portion is all included (added). With respect to the RAPID, the sequential order of the first portion and the sequential order of the second portion is the same.

As shown in FIG. 12, the RAR field is divided into two portions. The RAR field part 1 is the portion that Rel-8 UEs and Rel-9 UEs will decode, and the RAR field part 2 is the portion that Rel-9 UEs will decode. Thus, the RAR field part 1 has the same format as that of the Rel-8 RAR field. Also, the RAR field part 2 includes the new contents defined in Rel-9.

Accordingly, when a random access response (RAR) is received, if a Rel-8 UE finds that the preamble ID it transmitted exists, the corresponding RAR part 1 is decoded and operation is performed. Also, when a random access response (RAR) is received, if a Rel-9 UE finds that the preamble ID it transmitted exists, the corresponding RAR part 1 as well as RAR part 2 are decoded and operation is performed. In this case, if the RAR part 2 is selectively included by the base station (eNB), the R field of RAR part 1 can be used to inform about the existence of RAR part 2.

Regarding some exemplary effects of the present invention, with respect to the random access response (RAR) message transmitted via a common channel, appropriate responses can be sent to UEs having respectively different versions (or releases).

The concepts and features of the present invention can also be summarized as follows:

If a recipient of a certain MAC PDU is evident to every UE, the format of the PDU can be made arbitrary or can be specific to that UE. For example, if a MAC PDU is transmitted to a Rel-9 UE via dedicated C-RNTI over PDCCH, the Rel-9 eNB can use Rel-9 specific MAC PDU format for that. Due to use of dedicated C-RNTI, other Rel-8 UEs will not decode that MAC PDU and there is no problem.

But if a recipient of a certain MAC PDU is not clear, the format of the PDU should be clear to every UEs. This is the case when a MAC PDU is transmitted via common RNTI such as T-C-RNTI or RA-RNTI. Because both Rel-8 UEs and Rel-9 UEs may receive a MAC PDU over common RNTI, the format of the MAC PDU should be understood by every UEs. If a Rel-9 eNB transmit a Rel-9 MAC PDU format and the version of the MAC PDU format is not known to the UEs, Rel-8 UEs will decode the message incorrectly using Rel-8 MAC PDU format.

Thus, we need specify how Rel-8 can avoid decoding Rel-9 field or data. Following can be considered.

Option 1: Preamble Grouping

If there is a mapping between RACH preambles and the related RAR format, the problem can be somewhat solved. I.e., if eNB wants to use new RAR format, eNB has to designate RACH preambles for which RAR will be sent using new RAR format. In this case, old RAR format is used for other RACH preambles.

In FIG. 10(b), the grouping of A and B may be delivered over SIB. If a UE supports Extended RAR format, it can use preambles from group B. But if a UE does not support, it should select preambles from group A.

Option 2: Setting of "R" Field

Another method is to use the "R" field to indicate format. For example, if "R" field is set to "0," it means that the Normal RAR format is used. And if "R" field is set to "1," it means that the Extended RAR format is used. Thus, if a Rel-8 UE sees a RAR field with "R" field equal to "1," the UE ignores the RAR field.

Option 3: Different RA-RNTI

In this method, RACH message 2 can include either only fields of Normal RAR format or only fields of Extend RAR format. And, different RA-RNTI is used to indicate which format is used. In this way, Rel-8 UE never sees a RAR field format of later releases.

Option 4: Dedicated Preamble Only

This is similar to solution 1. If the extended RAR format can be used only for a dedicated preamble, there is no need for Rel-8 UE to know the format of extended RAR field.

Here, the options listed above may sometimes not be perfect when used alone. For example, for both options 2 and 3, eNB may not know the release of the UE. Thus, eNB has to transmit both Normal RAR format and Extended RAR format for one received preamble.

For option 1, 2 and 4, a problem may occur when one RACH message 2 includes both Normal RAR format and Extend RAR format. Especially, a problem may occur when the length of RAR element is different for Normal RAR format and Extended RAR format. When Rel-8 receives a RACH message 2, it tries to identify whether RAPID that has been transmitted is included or not. Based on the relative location, the UE may try to decode the related RAR field within a MAC PDU. Following figures shows the example when the sizes of RAR fields are different.

In FIG. 12, it is assumed that Rel-8 UE has transmitted RACH preamble 2 and the actual transmission by eNB in FIG. 12(b). Because the UE does not know the length of Extended RAR, it assumes that the size of every RAR field is equal to 6. But if the actual size of extended RAR is different from 6, the Rel-8 UE takes up wrong portion of the MAC PDU for RAR field as shown in FIG. 12(a).

To solve this issue, following can be further considered:

Option 5: Size Limitation of Extended RAR

If we can fix the size of extended RAR format to 6 bytes, which is the size of normal RAR format, the problem can be solved. But, this may limit the usability of Extended RAR.

Option 6: Inclusion of Length Field

If length field is included in addition to the "R" field in the extended RAR format, the Rel-8 UE can identify when the next RAR field starts. I.e., when "R" field indicates that Extended RAR field is used, additional "Length" field is inserted. (Or, SIB can be used to indicate the size of Extended RAR field) Based on the length information, the Rel-8 UE can know at which octet each RAR field starts.

Option 7: Fixing the Order

If extended RAR field appear after all the other normal RAR, the problem can be prevented. But, if one RACH message 2 includes two format of RAR for same RAPID, the Rel-8 UE may be confused which one to follow.

Also, some concepts and features of the present invention can be described in the following manner.

The present invention provides a method of random access procedure, comprising: receiving information related to a random access preamble, the information indicating a first random access preamble related to a first format and a second random access preamble related to a second format; selecting a random access preamble according to the received information; transmitting the selected random access preamble; receiving a random access response; and decoding the received random access response according to the format associated with the selected random access preamble.

Here, the information is received via a system information block (SIB). The first format is associated with mobile terminals supporting Rel-8 or mobile terminals supporting LTE. The second format is associated with mobile terminals supporting Rel-9 or mobile terminals supporting LTE-Advanced. The random access response is received as a MAC PDU having a MAC header and MAC payload. The MAC payload comprises at least one MAC random access response (RAR), each MAC RAR comprising information about an uplink grant and a Temporary C-RNTI. The MAC RAR further includes an R bit used for indicating the first format or the second format associated with the selected random access preamble. The received random access response comprises one or more first messages having a Random Access RNTI1 (RA-RNTI1) related to the first format, and one or more second messages having a Random Access RNTI2 (RA-RNTI2) related to the second format. The received random access response comprises a single message containing at least one Random Access RNTI1 (RA-RNTI1) and at least one Random Access RNTI2 (RA-RNTI2).

Also, the received random access response comprises one or more Normal RAR elements and one or more Extended RAR elements. Each Normal RAR element and each Extended RAR element has a length of 6 bytes. The received random access response further comprises a length field to indicate a length of at least one of the Extended RAR elements. The Extended RAR elements are positioned after all of the Normal RAR elements.

The present invention also provides a mobile terminal comprising: means for receiving information related to a random access preamble, the information indicating a first random access preamble related to a first format and a second random access preamble related to a second format; means for selecting a random access preamble according to the received information; means for transmitting the selected random access preamble; means for receiving a random access response; and means for decoding the received random access response according to the format associated with the selected random access preamble.

Additionally, the present invention provides a network that performs a method of random access procedure, comprising: means for transmitting information related to a random access preamble, the information indicating a first random access preamble related to a first format and a second random access preamble related to a second format; means for receiving a particular random access preamble that was selected according to the transmitted information; and means for transmitting a random access response to be decoded according to the first format or the second format associated with the selected random access preamble.

The various features and concepts described herein may be implemented in software, hardware, or a combination thereof. For example, a computer program (that is executed in a computer, a terminal or a network device) for a method and system for performing random access procedures using extended random access response (RAR) messages may comprise one or more program code sections for performing various tasks. Similarly, a software tool (that is executed in a computer, a terminal or a network device) for a method and system for performing random access procedures using extended random access response (RAR) messages may comprise program code portions for performing various tasks.

The method and system for processing buffer status reports (BSRs) according to the present invention are compatible with various types of technologies and standards. Certain concepts described herein are related to various types of standards, such as GSM, WCDMA, 3GPP (LTE, LTE Advanced, etc.), IEEE, 4G and the like. However, it can be understood that the above exemplary standards are not intended to be limited, as other related standards and technologies would also be applicable to the various features and concepts described herein.

INDUSTRIAL APPLICABILITY

The features and concepts herein are applicable to and can be implemented in various types of user devices (e.g., mobile terminals, handsets, wireless communication devices, etc.) and/or network entities that can be configured to support performing random access procedures using extended random access response (RAR) messages.

As the various concepts and features described herein may be embodied in several forms without departing from the characteristics thereof, it should also be understood that the above-described embodiments are not limited by any of the details of the foregoing description, unless otherwise specified, but rather should be construed broadly within its scope as defined in the appended claims. Therefore, all changes and modifications that fall within such scope or equivalents thereof are therefore intended to be embraced by the appended claims.

The invention claimed is:

1. A method of random access procedure, comprising:
performing grouping and dividing of random access preambles according to versions of mobile terminals and random access response (RAR) formats;
receiving information related to the random access preamble at the mobile terminal,
the information indicating a first random access preamble related to a first format and a second random access preamble related to a second format;
selecting the random access preamble according to the received information;
transmitting the selected random access preamble;
receiving a random access response, wherein the received random access response comprises at least one of a first Random Access Radio Network Temporary Identifier (RA-RNTI) related to the first format and a second Random Access Radio Network Temporary Identifier (RA-RNTI) related to the second format,
wherein the received random access response further comprises an R bit used for indicating the first format or the second format associated with the selected random access preamble,
wherein the first format is associated with mobile terminals supporting Long Term Evolution (LTE) and the second format is associated with mobile terminals supporting LTE-Advanced; and
decoding the received random access response according to the format associated with the selected random access preamble.

2. The method of claim 1, wherein the information is received via a system information block (SIB).

3. The method of claim 1, wherein the first format is associated with mobile terminals supporting Release 8 (Rel-8).

4. The method of claim 1, wherein the second format is associated with mobile terminals supporting Release 9 (Rel-9).

5. The method of claim 1, wherein the random access response is received as a Medium Access Control Protocol Data Unit (MAC PDU) having a MAC header and MAC payload.

6. The method of claim 5, wherein the MAC payload comprises at least one MAC random access response (RAR), each MAC RAR comprising information about an uplink grant and a Temporary Cell-Radio Network Temporary Identifier (C-RNTI).

7. The method of claim 1, wherein the received random access response comprises one or more Rel-8 random access response (RAR) elements and one or more Rel-9 random access response (RAR) elements.

8. The method of claim 7, wherein each Rel-8 random access response (RAR) element and each Rel-9 random access response (RAR) element has a length of 6 bytes.

9. The method of claim 7, wherein the received random access response further comprises a length field to indicate a length of at least one of the Rel-9 random access response (RAR) elements.

10. The method of claim 7, wherein the Rel-9 random access response (RAR) elements are positioned after all of the Rel-8 random access response (RAR) elements.

11. A mobile terminal comprising:
means for receiving information relating to performing grouping and dividing of random access preambles according to versions of mobile terminals and random access response (RAR) formats;
means for receiving information related to the random access preamble, the information indicating a first random access preamble related to a first format and a second random access preamble related to a second format;
means for selecting the random access preamble according to the received information;
means for transmitting the selected random access preamble;
means for receiving a random access response, wherein the received random access response comprises at least one of a first Random Access Radio Network Temporary Identifier (RA-RNTI) related to the first format and a second Random Access Radio Network Temporary Identifier (RA-RNTI) related to the second format,
wherein the received random access response further comprises
an R bit used for indicating the first format or the second format associated with the selected random access preamble,
wherein the first format is associated with mobile terminals supporting Long Term Evolution (LTE) and the second format is associated with mobile terminals supporting LTE-Advanced; and
means for decoding the received random access response according to the format associated with the selected random access preamble.

12. A network that performs a method of random access procedure, comprising:
means for performing grouping and dividing of random access preambles according to versions of mobile terminals and random access response (RAR) formats;
means for transmitting information related to the random access preamble, the information indicating a first random access preamble related to a first format and a second random access preamble related to a second format;
means for receiving the random access preamble that was selected according to the transmitted information; and
means for transmitting a random access response to be decoded according to the first format or the second format associated with the selected random access preamble,
wherein the transmitted random access response comprises at least one of a first Random Access Radio Network Temporary Identifier (RA-RNTI) related to the first format and a second Random Access Radio Network Temporary Identifier (RA-RNTI) related to the second format,
wherein the transmitted random access response further comprises an R bit used for indicating the first format or the second format associated with the selected random access preamble,
wherein the first format is associated with mobile terminals supporting Long Term Evolution (LTE) and the second format is associated with mobile terminals supporting LTE-Advanced.

* * * * *